No. 830,044. PATENTED SEPT. 4, 1906.
H. S. BLACKMORE.
AROMATIC KETONE AND PROCESS OF MAKING SAME.
APPLICATION FILED OCT. 13, 1902.
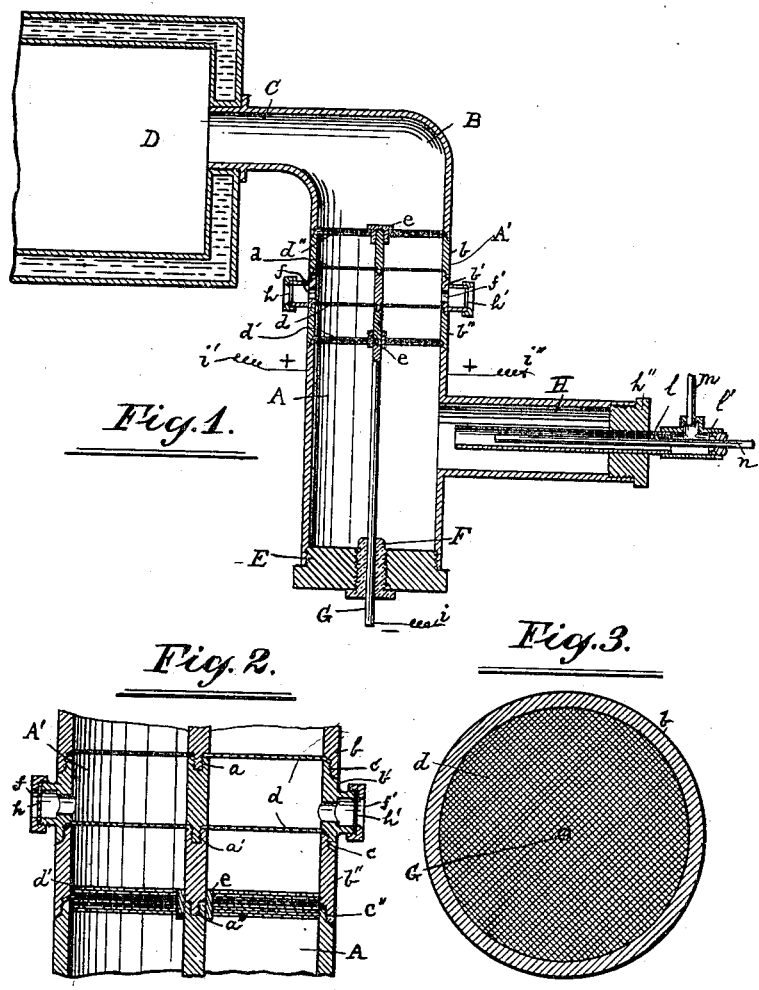
WITNESSES.
C. C. Wright
H. N. Jenkins
INVENTOR:
Henry Spencer Blackmore

UNITED STATES PATENT OFFICE.

HENRY SPENCER BLACKMORE, OF MOUNT VERNON, NEW YORK.

AROMATIC KETONE AND PROCESS OF MAKING SAME.

No. 830,044.  Specification of Letters Patent.  Patented Sept. 4, 1906.

Application filed October 13, 1902. Serial No. 127,132. (Specimens.)

*To all whom it may concern:*

Be it known that I, HENRY SPENCER BLACKMORE, a citizen of the United States, residing at Mount Vernon, in the county of Westchester and State of New York, have invented certain new and useful Improvements in Pyroxylin Solvents and Aromatic Ketones, of which the following is a specification.

The object of my invention is to produce aromatic ketones for employment as solvents for pyroxylin and for other purposes; and the process consists in oxidizing aromatic hydrocarbons of the general formula $(C_5H_8)_n$ while maintaining the temperature below the dissociating-point of the ketone desired.

My invention relates more especially to the production of solid ketones, such as the keto derivative of tetrahydro-methylpropyl benzene, which may be isolated by sublimation after oxidation of the hydrocarbon, such as correspond to the general formula $(C_5H_8)_n$, but is not confined to this particular class of aromatic ketones, but may include aromatic liquid ketones, which are often produced by the union or condensation of complex ketones, any one of which may exist individually as a solid, but on their union produce a liquid having similar properties, such as camphor and menthone.

In carrying out my invention for the production of the keto derivative of tetrahydro-methylpropyl benzene, $(C_3H_7.C_5H_6CO.CH_3,)$ which is an excellent solvent in its liquefied condition for pyroxylin, I proceed as follows, reference being had to the accompanying drawings, which illustrate a preferred form of apparatus which I employ for the purpose.

Referring to the drawings, Figure 1 is a vertical longitudinal section of my apparatus. Fig. 2 is an enlarged vertical section showing the electric diaphragms and the connection of the transforming-chamber, and Fig. 3 is a cross-section of one of the rings and electric connection of the transforming-chamber and an electric gauze diaphragm connected therewith.

Similar letters refer to corresponding parts in the several views.

The letter A designates a transforming-chamber of cylindrical or other form provided at its top with an elbow B and pipe C, the latter connected with a jacketed condenser D in any desired air-tight manner. The lower end of the transforming-chamber A is provided with a detachable head E, having a central stuffing-box or screw-threaded plug F, of insulating material, connected therewith and in which is fitted a rod or electric connection G, the upper portion of which is formed in sections having screw-threaded connections, as shown at $a$ $a'$ $a''$ in Fig. 2. The transforming-chamber A, like the electric connection G, is partly composed of sections, as shown at $b$ $b'$ $b''$, (see Figs. 1 and 2,) the said sections being joined together by the threaded ends $c$ $c'$ $c''$. A series of metallic-gauze diaphragms $d$ are arranged within the transforming-chamber A, the said diaphragms being securely held in relative positions by the abutting shoulders of the screw-threaded ends of the transforming-chamber rings and of the central connection thereof. The upper and lower diaphragms $d'$ and $d''$ are arranged in several thicknesses, forming a heat-absorber and flash-preventer, and insulated from the electrical connection G, as shown at $e$ $e'$, for the purposes hereinafter fully described. Peep-holes $f$ $f'$, having mica fronts or covers $h$ $h'$, are located at the opposite sides of the combustion or transforming compartments A' to enable the attendant to view the interior thereof and provide for regulating the apparatus as occasion may require.

The letters $i$ and $i'$ and $i''$ designate electric wires, which are respectively connected with the electric conductor G and the walls of the transforming-chamber A by ordinary means.

The lower part of the transforming-chamber is provided horizontally with a pipe-section H, having a detachable end or head $h''$, within which is tightly fitted a tube $l$, the latter provided with a T-head $l'$ and an inlet-pipe $m$, while within the stem of the T-head and the tube $l$ is arranged a pipe $n$ for the purposes hereinafter fully specified.

In the operation of my invention for the production of the keto derivative of tetrahydro-methylpropyl benzene I take dipentene $(C_5H_8)_2$ and vaporize it by means of heat or a current of heated gas and convey it into a transforming-chamber of the apparatus described through the pipe $n$. I then introduce carbon dioxid $(CO_2)$ through the pipe $m$, regulating it to about equivalent proportions to produce by condensation and oxidation the keto derivative of tetrahydro-methylpropyl benzene and carbonic oxid, as hereinafter set forth. As the dipentene vapor and carbon dioxid enter the apparatus they become thoroughly mixed in the lower part of the chamber A, then pass up through an insulated-gauze flash-preventer $d'$ into the transforming-compartment A'. A current of electricity is then passed through the connections $i$ $i'$ $i''$, the same passing through the diaphragms $d$ $d$, heating them, in proportion to the strength of the current, either low red or to whiteness, as desired, the temperature being somewhat gaged by the color of the diaphragm, which can be observed through the mica-closed peep-holes $ff'$. As the mixture of dipentene vapor and carbon dioxid comes in contact with the heated gauze diaphragms a reaction takes place, which may be illustrated by the following chemical formula or equation:

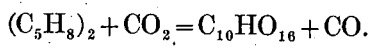

$$(C_5H_8)_2 + CO_2 = C_{10}HO_{16} + CO.$$

The current of vapor and gas introduced passing rapidly through the apparatus carries the product of reaction quickly through and away from the heated gauze diaphragms and through the flash-preventer $d''$, which consists of a number of layers of gauze insulated, as before described, from the central conductor and which also acts as a strainer or absorbent of the excess of heat and conveys it away, thus preventing the temperature from rising above the dissociating-point of the product produced. The keto derivative of tetrahydro-methylpropyl benzene product produced is conveyed to a water-jacketed condenser D, where the sublimed vapor condenses into the solid compound $C_{10}H_{16}O$.

It will be observed that the transforming-compartment A', in which the electrically-heated diaphragms are located, is protected at the inlet and outlet portions with heavy insulated gauze sections, which prevent the ignited mixture of gases in said compartment from conveying the flash outside of the compartment and admits of controlling the temperature of the product by rapidity of admission of gases thereto during transformation, the electric diaphragms $d$ $d$ being maintained at a uniform temperature.

I can produce aromatic ketones by employing other aromatic hydrocarbons or a mixture of hydrocarbons to produce complex aromatic ketones, the aromatic hydrocarbons being vaporized directly or conveyed to the transforming apparatus in vaporous or gaseous form, and I can employ other oxygen-yielding carbon compounds as oxidizing agents instead of carbon dioxid without departing from the spirit of my invention, which consists in transforming aromatic hydrocarbons into their keto derivatives by the action of oxygen-yielding carbon compounds as oxidizing agents while maintaining the temperature of the reacting ingredients below the dissociating-point of the aromatic ketone desired.

The dipentene which I employ in making the keto derivative of tetrahydro-methylpropyl benzene by the action of a carbon oxy-acid anhydrid, such as carbon dioxid heated to a suitable temperature, I prefer to obtain by heating oil of turpentine for several hours at an average temperature approximating 260° under superatmospheric pressure, whereby the pinene content is transformed into dipentene which is readily collected by distillation.

It can be readily seen that the diaphragms $d$ $d$ in the transforming-compartment A' serve to ignite the mixture of vaporous or gaseous hydrocarbon and oxidizing agent, such as carbon dioxid, ($CO_2$,) as it comes in contact therewith and the excess of heat either absorbed therefrom or liberated by reaction is carried away from the heated diaphragms by the rapid-flowing gas or vapors admitted and the heat-absorbing gauze diaphragm $d''$, the heated diaphragms serving to unite the aromatic hydrocarbon with the oxygen of the oxidizing agent, and the heat is abstracted so fast that the temperature is reduced below igniting-point. Any suitable heater may be employed in connection with my apparatus in lieu of an electrical heater; but I have found that an electrical heater is more easily controlled than a heater of any other form and that by its use the temperature may be controlled and maintained with great uniformity and precision. I find it unnecessary to employ any temperature-indicating device, as in practice the thermal condition of the apparatus and its contents will be determined by the results attained.

The product of my process is a colorless semitransparent substance, melting and subliming without decomposition at 210° centigrade, having an aromatic camphoraceous odor, and being in its molten condition a ready solvent for pyroxylin.

A pharmacological examination of the product of this process reveals under the microscope a mass of infinitesimal ellipsoidal crystals having elongated and pointed ends and being closely and concretely associated together, forming a tenacious material of somewhat brittle character, readily soluble in alcohol, small particles of which also float upon water with a peculiarly rotating and characteristic motion, which immediately ceases in the presence of an oily substance.

Having now described my invention, what I claim as new, and desire to secure by Letters Patent, is—

1. The process of making pyroxylin solvents and aromatic ketones, which consists in oxidizing aromatic hydrocarbons by the action of an oxygen-yielding carbon compound.

2. The process of making pyroxylin solvents and aromatic ketones, which consists in oxidizing aromatic hydrocarbons by the action of a carbon-oxid oxidizing agent at a reacting temperature, and maintaining the temperature below the dissociating-point of the product desired by refrigeration.

3. The process of making pyroxylin solvents and aromatic ketones, which consists in exposing aromatic hydrocarbons to the action of a carbon oxy-acid anhydrid at a reacting temperature.

4. The process of making pyroxylin solvents and aromatic ketones, which consists in exposing a composition containing a condensed product of hydrocarbon and carbon oxy-acid anhydrid to the action of heat, and maintaining the temperature below the dissociating-point of the product desired.

5. The process of making pyroxylin solvents and aromatic ketones, which consists in condensing and oxidizing aromatic hydrocarbons having a general formula of the ratio $(C_5H_8)_n$ by the action of a carbon oxy-acid anhydrid while maintaining the temperature below the dissociating-point of the product desired.

6. The process of making a keto derivative of tetrahydro-methylpropyl benzene, which consists in oxidizing dipentene by the action of a carbon oxy-acid anhydrid while maintaining the temperature below the dissociating-point of the product desired.

7. The process of making pyroxylin solvents and aromatic ketones, which consists in oxidizing a vaporized or gaseous aromatic hydrocarbon by the action of an oxygen-yielding carbon compound while maintaining the temperature below the dissociating-point of the product desired.

8. The process of making pyroxylin solvents and aromatic ketones, which consists in vaporizing an aromatic hydrocarbon and oxidizing the same by the action of an oxygen-yielding carbon compound while maintaining the temperature below the dissociating-point of the product desired.

9. The process of making aromatic ketones, which consists in exposing aromatic hydrocarbons to the action of carbon dioxid at a reacting temperature, and maintaining the temperature below the dissociating-point of the product desired.

10. The process of making aromatic ketones, which consists in exposing dipentene to the action of carbon dioxid at a reacting temperature, and maintaining the temperature below the dissociating-point of the product by refrigeration.

11. As a new article of manufacture a solid aromatic ketone consisting of a colorless, semitransparent substance composed of small particles of ellipsoidal crystals having pointed ends, the said crystals being concretely associated, readily soluble in alcohol and melting and subliming without decomposition at 210° centigrade, said ketone having an aromatic camphoraceous odor.

12. As a new article of manufacture, a solid aromatic ketone consisting of a colorless, semitransparent substance, melting and subliming without decomposition at 210° centigrade, having an aromatic camphoraceous odor and being, in its molten state, a ready solvent for pyroxylin.

In testimony whereof I affix my signature in presence of two witnesses.

HENRY SPENCER BLACKMORE.

Witnesses:
H. N. JENKINS,
C. C. WRIGHT.